US008649158B2

(12) United States Patent
Herrmann et al.

(10) Patent No.: US 8,649,158 B2
(45) Date of Patent: Feb. 11, 2014

(54) CAPACITOR ARRANGEMENT AND METHOD FOR PRODUCING A CAPACITOR ARRANGEMENT (75) Inventors: Hubert Herrmann, Haimhausen (DE); Werner Riebesel, Friedberg (DE); Jürgen Kneissl, Jetzendorf (DE)

(73) Assignee: MTU Aero Engines AG, Munich (DE)

( * ) Notice: Subject to any disclaimer, the term of this patent is extended or adjusted under 35 U.S.C. 154(b) by 51 days.

(21) Appl. No.: 13/123,507

(22) PCT Filed: Oct. 8, 2009

(86) PCT No.: PCT/DE2009/001398
§ 371 (c)(1),
(2), (4) Date: Jun. 17, 2011

(87) PCT Pub. No.: WO2010/040343
PCT Pub. Date: Apr. 15, 2010

(65) Prior Publication Data
US 2011/0242725 A1   Oct. 6, 2011

(30) Foreign Application Priority Data
Oct. 8, 2008  (DE) .................. 10 2008 050 452

(51) Int. Cl.
*H01G 4/228* (2006.01)
*H01G 4/248* (2006.01)
(52) U.S. Cl.
USPC ............... 361/306.1; 361/306.3; 361/310
(58) Field of Classification Search
None
See application file for complete search history.

(56) References Cited

U.S. PATENT DOCUMENTS

| | | | |
|---|---|---|---|
| 6,160,696 A * | 12/2000 | Bailey et al. ............. | 361/115 |
| 6,249,448 B1 | 6/2001 | Regnier et al. | |
| 6,473,291 B1 | 10/2002 | Stevenson | |
| 6,958,899 B2 * | 10/2005 | Togashi et al. ............. | 361/303 |
| 2007/0002594 A1 | 1/2007 | Otsuka et al. | |
| 2007/0109715 A1 | 5/2007 | Azuma et al. | |

FOREIGN PATENT DOCUMENTS

| | | |
|---|---|---|
| DE | 19826731 A1 | 12/1999 |
| DE | 19847028 A1 | 4/2000 |
| DE | 19847029 A1 | 4/2000 |
| EP | 0914708 B1 | 9/2002 |
| EP | 1632117 B1 | 12/2004 |
| WO | 98/04029 A1 | 1/1998 |

OTHER PUBLICATIONS

Deutsches Patent- und Markenamt (German Patent Office): Search Report; Jul. 10, 2009; 5 pages.
PCT: International Search Report and Written Opinion of PCT/DE2009001398; Feb. 24, 2010; 8 pages.
PCT: International Search Report and Written Opinion of PCT/DE2009001398; Feb. 24, 2010; 10 pages.

* cited by examiner

*Primary Examiner* — Jayprakash N Gandhi
*Assistant Examiner* — Dion Ferguson
(74) *Attorney, Agent, or Firm* — Howison & Arnott, LLP (57) ABSTRACT The present invention relates to a capacitor arrangement having a capacitor and a first terminal plate and a second terminal plate. The capacitor has a first contact face and a second contact face arranged opposite one another. The terminal plates are each connected to one of the contact faces and have protrusions on one end suitable for engaging in recesses in a power rail.

20 Claims, 6 Drawing Sheets

CAPACITOR ARRANGEMENT AND METHOD FOR PRODUCING A CAPACITOR ARRANGEMENT

CROSS-REFERENCE TO RELATED APPLICATIONS

This application is a U.S. National Phase application submitted under 35 U.S.C. §371 of Patent Cooperation Treaty application serial no. PCT/DE2009/001398, filed Oct. 8, 2009, and entitled CAPACITOR ARRANGEMENT AND METHOD FOR PRODUCING A CAPACITOR ARRANGEMENT, which application claims priority to German patent application serial no. 10 2008 050 452.1, filed Oct. 8, 2008, and entitled Kondensatoranordnung and Verfahren zum Herstellen einer Kondensatoranordnung.

Patent Cooperation Treaty application serial no. PCT/DE2009/001398, published as WO 2010/040343, and German patent application serial no. 10 2008 050 452.1, are incorporated herein by reference.

TECHNICAL FIELD

The present invention relates to a capacitor arrangement and a method for manufacturing a capacitor arrangement.

BACKGROUND

EP 1 632 117 B1 relates to an electronic module for switching electric power. The module has two power supply rails spaced a distance apart from one another and a capacitor arrangement which bridges the two power supply rails.

With the known approaches, so-called module capacitors are constructed on a separate circuit board and connected to power modules by means of connections of a suitable length. In addition to the additional space required for the circuit board, an additional circuit board layout is also necessary. In addition, this also results in a poor utilization of space. The circuit board is also associated with additional weight. The long connections result in a higher inductance, which in turn results in limiting the switching frequencies of the power modules.

SUMMARY AND DESCRIPTION

The object of the present invention is to create an improved capacitor arrangement and an improved method for manufacturing a capacitor arrangement.

This object is achieved by a device as described and claimed herein as well as a method as described and claimed herein.

The present invention is based on the finding that a capacitor can be applied to a substrate of a power module through the use of specially shaped capacitor terminal plates without any loss of lifetime. Damage to the capacitor due to high temperature stress due to the soldering process can be prevented according to the invention. In this way it is possible to ensure capacitor availability after the manufacturing process.

Furthermore, a compact design of the power module optimized with regard to installation space is made possible through the special capacitor terminal plates. Therefore, contacts that have been optimized with regard to installation space and weight and in particular a low inductance contacting of the module capacitor on the power module or electronic power module can be performed. This leads to a low parasitic inductance between the power elements and the capacitor. A better thermal connection of the capacitor to a module cooler is also possible.

The present invention creates a capacitor arrangement having the following features:
a capacitor having a first contact face and a second contact face, where the first and second contact faces are arranged opposite one another;
a first terminal plate which is connected to the first contact face, whereby the first terminal plate has on one end protrusions suitable for engaging in recesses in a first angled area of a first power rail of an electronic power module; and
a second terminal plate which is connected to the second contact face whereby the second terminal plate has on one end protrusions suitable for engaging in recesses in a first angled area of a second power rail of the electronic power module.

The capacitor may be suitable for use in a power module. Accordingly, the power rails may be designed to provide an electrical connection between the capacitor and a substrate of the power module. In particular the power rails may be so-called power bus bar terminals. The recesses in the power rails may be implemented in the form of grooves or through-holes. A direct connection of the module capacitor, which may consist of the capacitor and the terminal plates, to the power module is advantageously possible. Therefore, a low inductance and a compact design can be achieved. This is possible due to the special inventive connection geometries for the module capacitor and the power rails. A direction connection of the module capacitor to the electronic power module may be achieved in particular through the special terminal plates and power rails. The capacitor can thus be arranged as close as possible to the electronic power module.

The contact faces and the terminal plates may be aligned in parallel to one another. In this way the contact faces can be connected to the terminal plates over the full area. The capacitor may be arranged in a space-saving manner in parallel above the substrate. Thus the terminal plates which are arranged perpendicularly with respect to the alignment of the capacitor permit the shortest possible connection of the capacitor to the substrate.

The capacitor arrangement may have the first and second power rails whereby the power rails may be aligned in parallel to the terminal plates and the protrusions of the terminal rails may engage in the recesses in the power rails. The inventive capacitor arrangement may thus replace known module capacitors without necessitating adjustments in the substrate, for example, the power module.

The capacitor arrangement may have soldered connections and/or welded connections, which are designed to connect at least a few of the protrusions on the first terminal plate to the first power rail and to connect at least a few of the protrusions on the second terminal plate to the second power rail. Soldering of the grooved capacitor terminal plates to the power rail terminals is thus possible.

The soldered connections may advantageously each be arranged on a side of the power rail opposite the capacitor. The soldered connections can thus be created easily and in such a way that they are accessible from the outside.

According to one embodiment, the terminal plates may each have an angled area, which is designed in each case to be adjacent to a second angled area of the power rails in a form-fitting manner. The angled areas can stabilize the construction of the capacitor arrangement and represent an additional electrical contact.

Furthermore, the capacitor arrangement may have screw connections, which are designed to connect each of the angled areas of the terminal plates to the second angled areas of the power rails. A simple connection of the module capacitor to the power rails can thus be created. The angled areas of the module capacitor can then be bolted to an intermediate circuit.

The present invention also creates a method for manufacturing a capacitor arrangement comprising the following steps:

Providing a capacitor having a first contact face and a second contact face, whereby the first and second contact faces are arranged opposite one another;

Providing a first power rail and a second power rail each having a first angled area having recesses;

Providing a first terminal plate and a second terminal plate each having on one end protrusions suitable for engaging in the recesses in the power rails;

Connecting the terminal plates to the contact faces so that the first terminal plate is aligned toward the first contact face and the second terminal plate is aligned to the second contact face; and Connecting the terminal plates to the power rails so that the first terminal plate is aligned in parallel to the first power rail and the second terminal plate is aligned in parallel to the second power rail and the protrusions on the first terminal plate engage in the recesses in the first power rail and the protrusions on the second terminal plate engage in the recesses in the second power rail.

The present invention thus creates a manufacturing concept for integration of capacitors on hybrid power modules which is based on a special embodiment of the capacitor terminals and the power rails. An inventive process description here defines how the special capacitor embodiment is attached to the substrate. The inventive manufacturing process proceeds in such a way that the power rails are first applied to the substrate of the power module without a capacitor. In a subsequent step, the module capacitor consisting of the capacitor and the terminal plates is then connected to the power rails by means of simple soldering.

The inventive method may include a step of joining the power rails to a substrate before the terminal plates are connected to the power rails. Due to the proposed sequence, it is possible to prevent a great influence of temperature on the capacitor when the power rails are soldered to the substrate. The substrate may be the substrate of the power module. The substrate may be embodied as a circuit board.

This method may comprise a step of creating soldered joints which are embodied to connect at least a few of the protrusions on the first terminal plate to the first power rail and to connect at least a few of the protrusions on the second terminal plate to the second power rail. In this way the capacitor arranged between the terminal plates can be connected to the power rails, such that a temperature influence on the capacitor can again be minimized.

According to the invention, the terminal plates may each have an angled area, which is adjacent to a second angled area of the power rails in a form-fitting manner, and the method may comprise a step of creating a first screw connection for connecting the angled area of the first terminal plate to the second angled areas of the first power rail and a second screw connection for connecting the angled area of the second terminal plate to the second angled areas of the second power rail. The screw connection allows an independent or additional electrical and mechanical connection of the capacitor in addition to the soldered joint.

BRIEF DESCRIPTION OF THE DRAWINGS

Preferred exemplary embodiments of the present invention are explained in greater detail below with reference to the accompanying drawings in which.

DETAILED DESCRIPTION

In the following description of the preferred exemplary embodiments of the present invention, the same or similar reference numerals are used for the similarly acting elements depicted in the various drawings, thereby omitting a repeated description of these elements.

Figure 1:
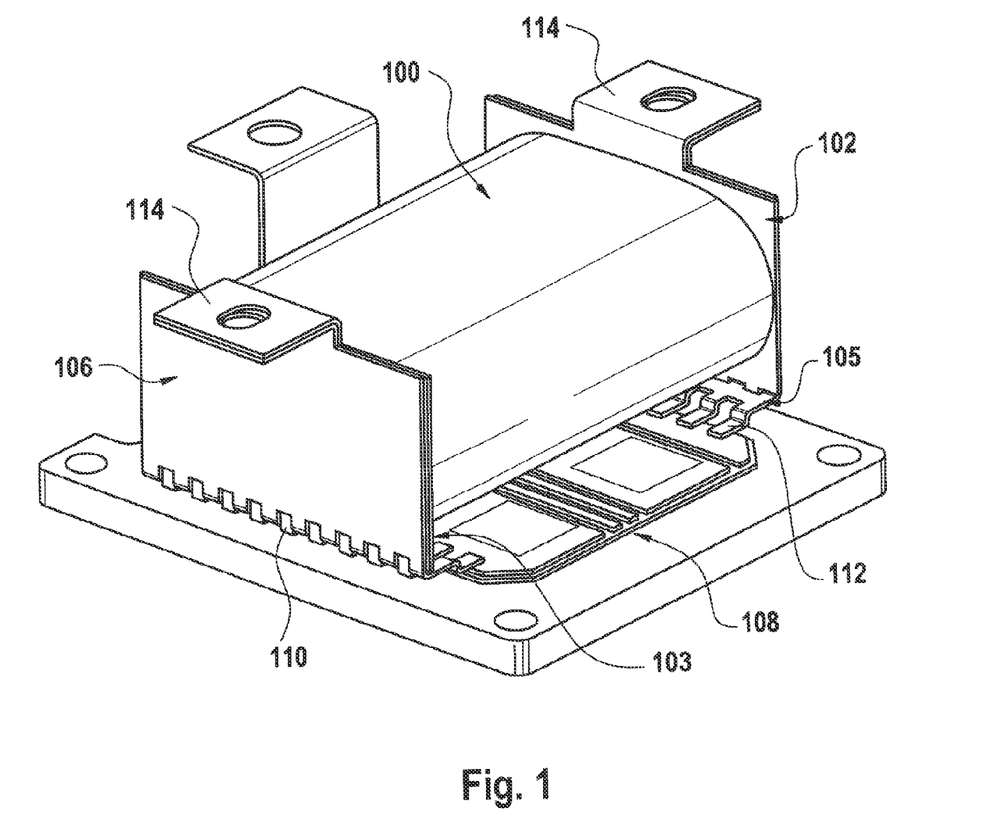
FIG. 1 shows an inventive capacitor arrangement.

FIG. 1 shows a capacitor arrangement according to an exemplary embodiment of the present invention. This shows in particular a final modular diagram without a housing. The capacitor arrangement has a capacitor 100, a first terminal plate 102 and a second terminal plate 103. The terminal plates 102, 103 are each connected to contact faces of the capacitor 100. The capacitor arrangement may also have a first power rail 105 and a second power rail 106. The power rails 105, 106 may be arranged on a substrate 108, for example, the substrate of a power module and may be connected to the terminal plates 102, 103. Thus the capacitor 100 may be arranged between the terminal plates 102, 103 and the terminal plates may in turn be arranged between the power rails 105, 106. According to the diagram in FIG. 1, the capacitor 100 is aligned in parallel and above a surface of the substrate 108.

The contact faces of the capacitor 100 may be aligned opposite and in parallel with one another. The first contact face is connected to the first terminal plate 102 and the second contact face is connected to the second terminal plate 103. Thus the terminal plates 102, 103 may be aligned in parallel to the contact faces. The terminal plates 102, 103 may be made of metal. The terminal plates 102, 103 and the contact faces may be soldered to create an electrical and mechanical connection. Known soldering methods may be used to create the soldered connections.

For connecting the terminal plates 102, 103 to the power rails 105, 106, the terminal plates 102, 103 each have protrusions 110 on the end facing the substrate 108. The protrusions 110 may be embodied by rectangular recesses in the terminal plates 102, 103. The protrusions 110 may be embodied over the entire length of the end of the terminal plates 102, 103 or only in partial areas of the terminal plates 102, 103.

The power rails 105, 106 may be made of metal and may be adapted to the terminal plates 102, 103 in size and shape. Thus the terminal plates 102, 103 may be in direct contact with the power rails 105, 106. The power rails 105, 106 may have a bend on the end facing the substrate 108. According to this exemplary embodiment, the power rails 105, 106 are bent at a right angle, each in the direction of the adjacent terminal plates 102, 103. In the area of the bend the power rails 105, 106 have recesses. The protrusions 110 on the terminal plates 102, 103 may engage in the recesses. Therefore the size and shape of the recesses may be adapted to those of the protrusions 110. In this way the terminal plates may be inserted from above along the power rails 105, 106 with the protrusions 110 into the recesses and then lie on the angled area of the power rails 105, 106. The power rails 105, 106 may have terminal contacts 112 in the angled area. The power rails 105, 106 may be connected electrically and mechanically to the substrate 108 by means of known methods, for example, soldering methods by way of the terminal contacts 112.

The terminal plates 102, 103 and the power rails 105, 106 may each have an angled area 114 on the end opposite the substrate 108. According to this exemplary embodiment the angled areas 114 are shaped by protrusions on the terminal plates 102, 103 and the power rails 105, 106. These protrusions are bent at a right angle on the side facing away from the capacitor 100 to create the angled areas 114. The areas 114 of the terminal plates 102, 103 and of the power rails 105, 106 that are angled at the top may each overlap and thus form bundles of laminations. The bundles of laminations may have a hole for receiving a screw.

Figure 2:
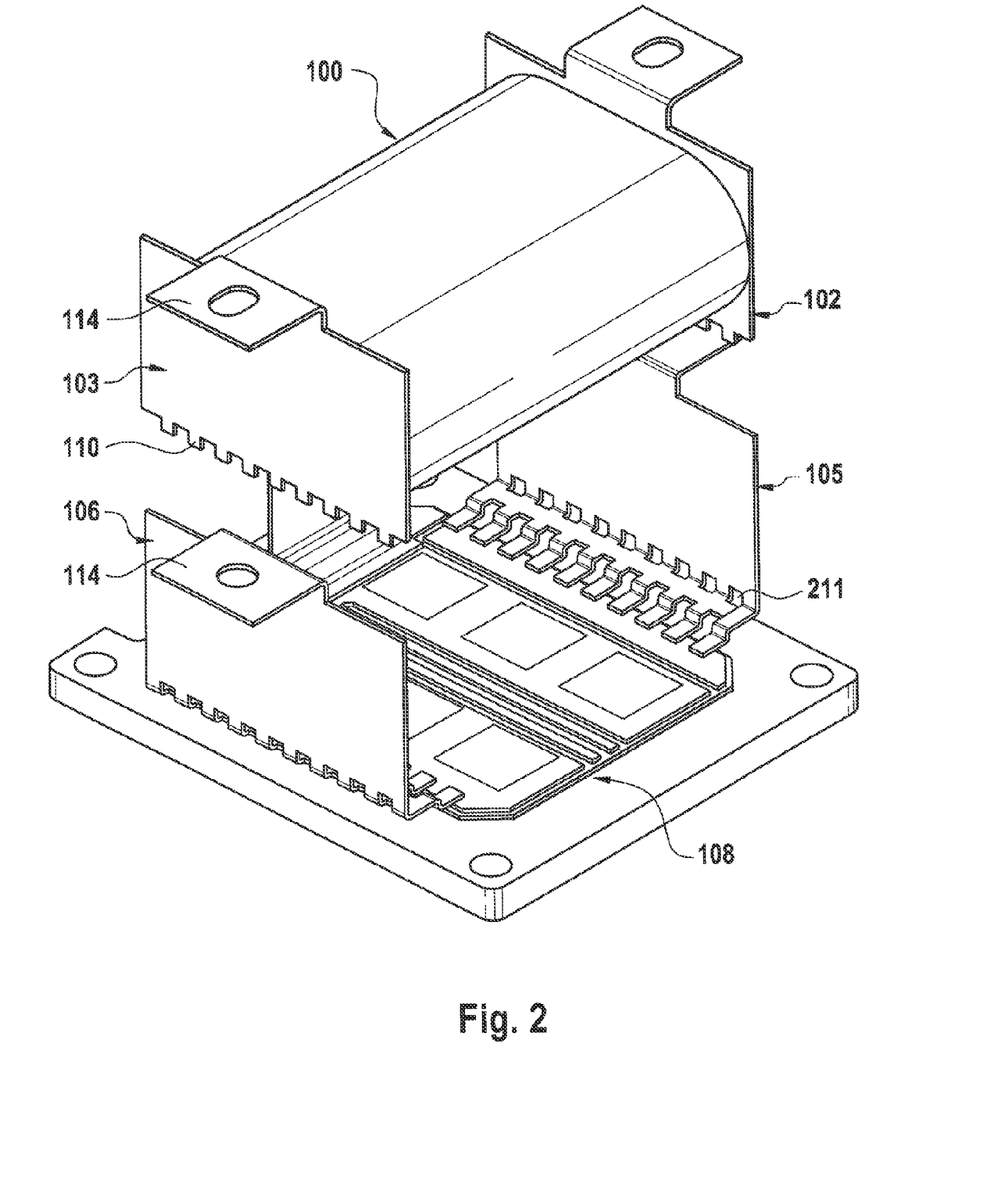
FIG. 2 shows a diagram of the inventive capacitor arrangement during production.

FIG. 2 shows the inventive capacitor arrangement during production, in which the module capacitor consisting of the capacitor 100 and the terminal plates 102, 103 soldered to the capacitor 100 is subsequently inserted between the power rails 105, 106. "Subsequently" here means that the power rails 105, 106 have first been connected to the substrate 108. In addition to the features already described on the basis of FIG. 1, FIG. 2 shows the recesses 211 in the power rails 105, 106. According to this exemplary embodiment, the recesses 211 are rectangular holes, which are arranged in the area of the rectangular bends in the power rails 105, 106 and extend on both sides of the bend.

To manufacture the inventive capacitor arrangement, first the capacitor 100, the power rails 105, 106 and the terminal plate 102, 103 may be provided. In one step of the method, the terminal plates 102, 103 are connected to the contact faces of the capacitor 100. A soldering operation may be used here. In another step of the method, the terminal plates 102, 103 are joined to the power rails 105, 106. The joining may be accomplished by using a plug connection by means of the protrusions 110 and the recesses 211, a soldered joint and additionally a screw connection of the angled areas 114. The angled areas 114 may be formed before or after joining the capacitor module 100, 102, 103 to the power rails 105, 106.

Thus, in order to integrate the capacitor 100 "into" the power module, the following steps are performed in a reasonable but freely selectable order. In one step of the method the terminal plates 102, 103 for the capacitor 100 can be applied to the capacitor 100 according to a known procedure. To do so, the capacitor 100 may be assembled with specially shaped (grooved) terminal plates 102, 103. Furthermore, the power rails 105, 106 may be applied to the substrate 108 by a known method. This may include applying the "metallic" power rails 105, 106 to copper conductors on the carrier substrate 108 at a high temperature. A dummy capacitor including terminals may have already been positioned to maintain the subsequent distances or the correct positioning of the power rail terminals may be ensured by a corresponding soldering device. After the connections of the power rails have cooled, the actual capacitor 100 may be inserted together with the terminal plates 102, 103 into the power rail grooves 211 and joined to the power rails 105, 106 with the help of a known soldering method or welding method. In conclusion, the individual metal packages may be converted to the proper shape at the upper end accordingly and bolted to the intermediate circuit terminal. In doing so, the upper capacitor terminals 114 with the upper power rails terminals may be angled by 90° and then bolted to the intermediate circuit terminals. Thus, there can be a connection of the module capacitor to the power rail termi-nals by soldering the capacitor 100 and/or its terminals 102, 103 without exposing the capacitor film to an excessively high temperature.

Figure 3:
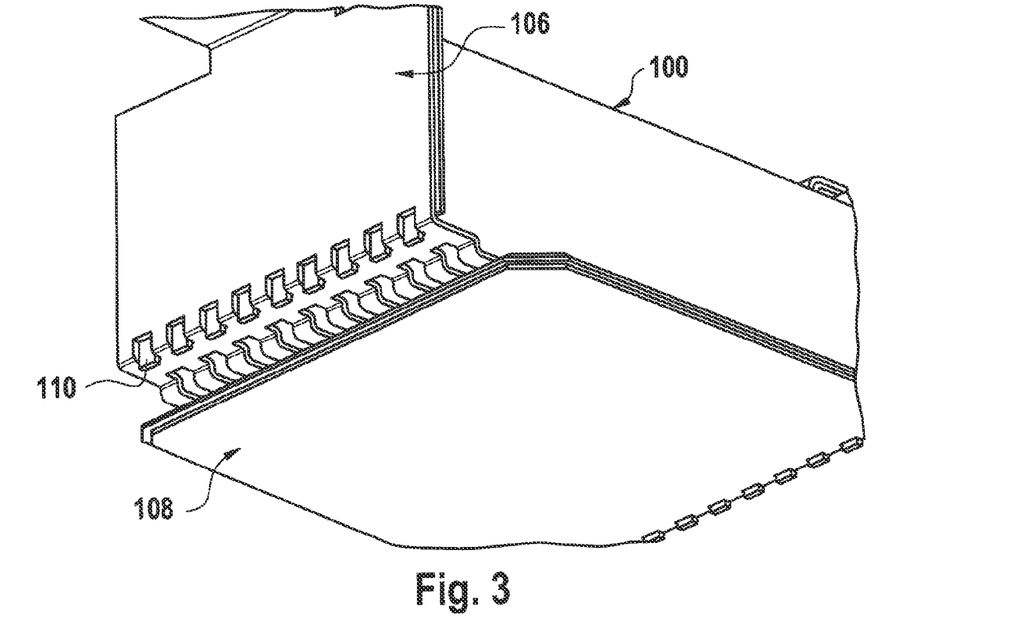
FIG. 3 another view of the inventive capacitor arrangement.

FIG. 3 shows a diagram of the inventive capacitor arrangement from underneath. In particular this shows contact points on the module capacitor with the power rail 106 in a view from the outside. The contact points are located in the areas where the protrusions 110 of the terminal plate engage in the recesses in the power rail 106. For joining the terminal plate to the power rail 106 the protrusions 110 may be soldered to the power rail 106 from the outside.

Figure 4:
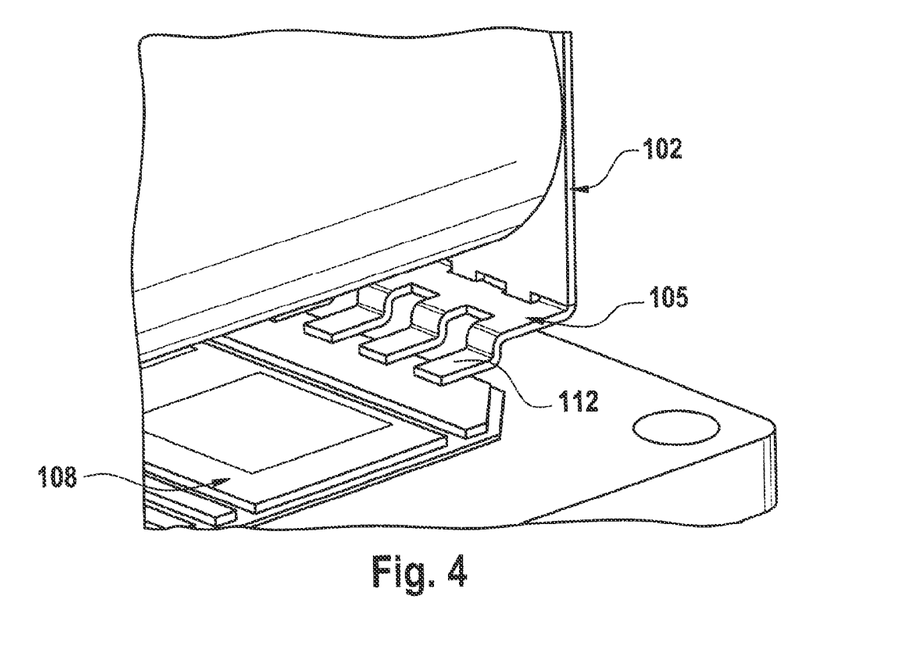
FIG. 4 shows a view of the contact points on the inventive capacitor arrangement.

FIG. 4 shows a diagram of the partial area of the inventive capacitor arrangement. In particular additional contact points between the module capacitor and the power rail 105 are shown in a view from the inside. The contact points are implemented by means of the terminal contacts 112. The terminal contacts 112 are implemented as angled protrusions on the power rail 105. The terminal contacts 112 may be in flat contact with a printed conductor of the substrate 108 and may be soldered to the printed conductor. The terminal contacts 112 may be bent several times, e.g., at a right angle to compensate for thermal and mechanical stresses.

Figure 5:
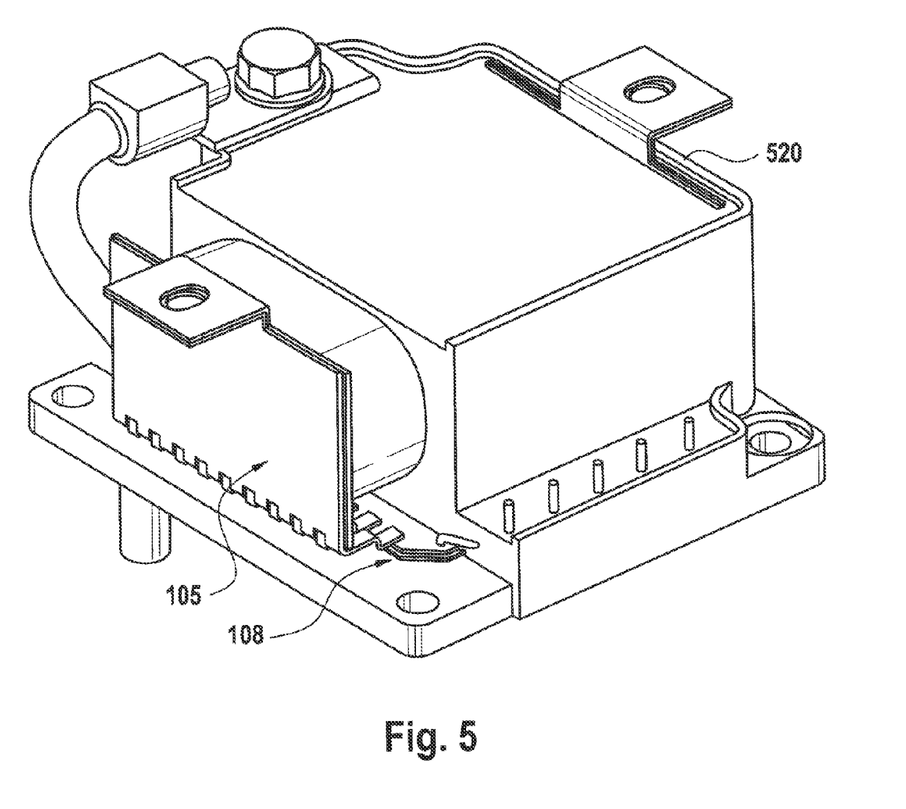
FIG. 5 shows a diagram of an electronic power module having the inventive capacitor arrangement.

FIG. 5 shows a diagram of the inventive capacitor arrangement as part of an electronic power module. In particular this shows a schematic diagram of the electronic power module, which has the inventive capacitor arrangement. The electronic power module has a housing 520. This housing 520 surrounds the capacitor of the capacitor arrangement at least partially. Furthermore, this shows a connecting line, which is connected to the capacitor arrangement by a screw connection.

Figure 6:
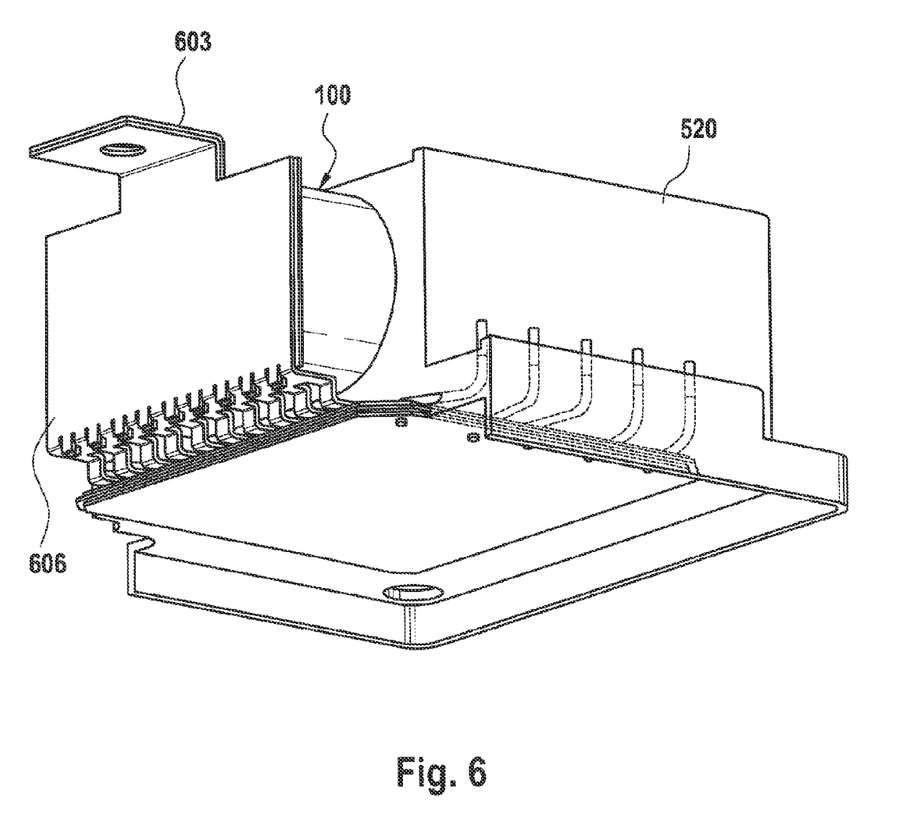
FIG. 6 shows a capacitor arrangement according to another exemplary embodiment of the present invention.

FIG. 6 shows a diagram of an inventive capacitor arrangement according to another exemplary embodiment of the present invention. The capacitor arrangement differs from the preceding exemplary embodiments in particular in the design of the power rails. This shows among other things the terminal plate 603 and a power rail 606 of the capacitor arrangement.

Figure 7:
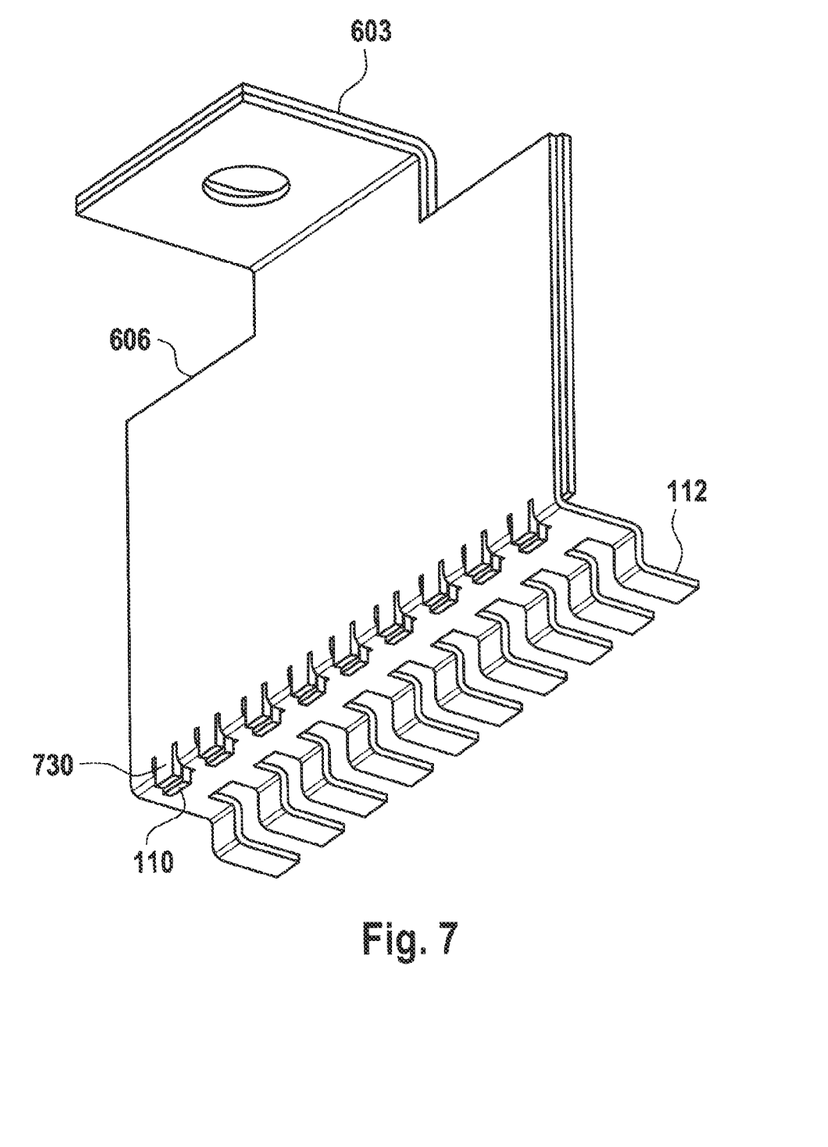
FIG. 7 shows a diagram of a power rail and of a terminal plate according to one exemplary embodiment of the present invention.

FIG. 7 shows a diagram of the terminal plate 603 and the power rail 606 of the capacitor arrangement shown in FIG. 6. The power rail 606 has recesses into which the protrusions 110 of the terminal plate 603 can be inserted. To design the recesses, the power rail 606 may be punched repeatedly on three sides. The areas punched out form protrusions 730 which may be aligned parallel to the protrusions 110 on the terminal plate 603. The protrusions 110 on the terminal plate 603 may protrude both laterally and longitudinally beyond the protrusions 730 on the power rail 606. The areas not punched out of the power rail 606 are bent and may form the terminal contacts 112 at the ends. As an alternative to punching, the protrusions 730 may be created by cutting, lasering or by some other method.

The exemplary embodiments described here are selected only as examples and may be combined with one another. The capacitor, the terminal plates and the power rails may be embodied in the form shown or in another suitable form. Furthermore, a plurality of capacitors may also be used. The steps for integration of the module capacitor may also be performed in an order other than that described here.

The invention claimed is:

1. An apparatus comprising:
  a capacitor having a first contact face and a second contact face, the first and second contact faces being spaced apart from one another;
  a first terminal plate connected to the first contact face, the first terminal plate having protrusions on one end, the protrusions extending over the entire length of the end of the terminal plate and being suitable for engaging in recesses in a first angled area of a first power rail of an electronic power module; and a second terminal plate connected to the second contact face, the second terminal plate having protrusions on one end, the protrusions extending over the entire length of the end of the terminal plate and being suitable for engaging in recesses in a first angled area of a second power rail of the electronic power module;

whereby the capacitor with connected first and second terminal plates may be arranged directly on the electronic power module.

2. An apparatus in accordance with claim 1, wherein the first and second terminal plates are aligned parallel to one another.

3. An apparatus in accordance with claim 1,
wherein the first power rail is aligned parallel to the first terminal plate and the second power rail is aligned parallel to the second terminal plate and the protrusions on the first and second terminal plates engage, respectively, in the recesses in the first angled areas of the first and second power rails.

4. An apparatus in accordance with claim 3, further comprising:
a first connection between at least a few of the protrusions on the first terminal plate and the first power rail, the first connection having been formed by one of soldering and welding; and
a second connection between at least a few of the protrusions on the second terminal plate and the second power rail, the second connection having been formed by one of soldering and welding.

5. An apparatus in accordance with claim 4, wherein the first and second connections are each disposed on a side of the respective power rails opposite the capacitor.

6. An apparatus in accordance with claim 3, further comprising:
an angled area formed on each of the first and second terminal plates;
a second angled area formed on each of the first and second power rails; and
wherein the angled areas of the terminal plates are configured to lie next to the second angled areas of the respective power rails in a form-fitting manner when the protrusions on the terminal plates engage in the respective recesses of the power rails.

7. An apparatus in accordance with claim 6, wherein the angled areas of each of the first and second terminal plates and the second angled areas of each of the first and second power rails are configured to accommodate a screw connection between the respective terminal plate and the respective power rail.

8. A method for connecting a capacitor to a substrate, the method comprising the following steps:
providing a capacitor having a first contact face and a second contact face, the first and second contact faces being spaced apart from one another;
providing a first power rail and a second power rail, each power rail having a first angled area with recesses;
providing a first terminal plate and a second terminal plate, each terminal plate having protrusions on one end, the protrusions extending over the entire length of the end of the terminal plate and being suitable for engaging in the recesses in the respective power rails;
connecting the first and second terminal plates to the respective contact faces so that the first terminal plate is aligned toward the first contact face and the second terminal plate is aligned toward the second contact face; and
connecting the first and second terminal plates to the respective power rails so that the first terminal plate is aligned parallel to the first power rail and the second terminal plate is aligned parallel to the second power rail and the protrusions on the first terminal plate engage in the recesses in the first power rail and the protrusions on the second terminal plate engage in the recesses in the second power rail.

9. A method in accordance with claim 8, further comprising the step of:
joining the first and second power rails to a substrate before the first and second terminal plates are connected to the respective power rails.

10. A method in accordance with claim 8, further comprising the step of:
creating a connection between at least some of the protrusions on the first terminal plate to the first power rail, the connection being created using one of soldering and welding; and
creating a connection between at least some of the protrusions on the second terminal plate to the second power rail, the connection being created using one of soldering and welding.

11. A method in accordance with claim 8, wherein:
the first and second terminal plates each have an angled area and the first and second power rails each have a second angled area and the angled areas of the terminal plates are configured to lie adjacent to the second angled areas of the respective power rails in a form-fitting manner when the protrusions on the terminal plates engage in the respective recesses of the power rails and further comprising the steps of
creating a first screw connection for connecting the angled area of the first terminal plate to the second angled area of the first power rail; and
creating a second screw connection for connecting the angled area of the second terminal plate to the second angled areas of the second power rail.

12. An apparatus comprising:
a capacitor having a first contact face and a second contact face, the first and second contact faces being spaced apart from one another;
a first terminal plate connected to the first contact face, the first terminal plate having a plurality of protrusions on one end;
a second terminal plate connected to the second contact face, the second terminal plate having a plurality of protrusions on one end;
a first power rail having a side portion with a first orientation and a connection portion with a second orientation, the side portion and the connection portion being disposed on opposite sides of a first angled area including recesses formed therein;
a second power rail having a side portion with a first orientation and a connection portion with a second orientation, the side portion and the connection portion being disposed on opposite sides of a first angled area including recesses formed therein; and
wherein the side portion of the first power rail is aligned parallel to, and in contact with, the first terminal plate and the side portion of the second power rail is aligned parallel to, and in contact with, the second terminal plate and the protrusions on the first and second terminal plates engage, respectively, in the recesses in the first angled areas of the first and second power rails.

13. An apparatus in accordance with claim 12, wherein the respective side portions of the first and second terminal plates are aligned parallel to one another.

14. An apparatus in accordance with claim 12, wherein each of the recesses on the first and second power rails are formed by punching on three sides in the respective first angled area prior to forming the bend of the first angled area.

15. An apparatus in accordance with claim 14, further comprising a plurality of protrusions on the first and second power rails, at lease one protrusion disposed adjacent to each recess on the respective power rails.

16. An apparatus in accordance with claim 15, wherein the protrusions on the first and second terminal plates protrude beyond the protrusions on the first and second power rails.

17. An apparatus in accordance with claim 12, wherein the protrusions on the first and second terminal plates protrude completely through the recesses in the respective power rails to the opposite side of the power rails.

18. An apparatus in accordance with claim 12, further comprising terminal contacts formed on the respective connection portions of the first and second power rails.

19. An apparatus in accordance with claim 18, wherein each terminal contact is configured with multiple bends.

20. An apparatus in accordance with claim 12, further comprising:
   an angled area formed on each of the first and second terminal plates;
   a second angled area formed on the side portion of each of the first and second power rails; and
   wherein the angled areas of the terminal plates are configured to lie next to the second angled areas of the respective power rails in a form-fitting manner when the protrusions on the terminal plates engage in the respective recesses of the power rails.

\* \* \* \* \*